July 19, 1949.  E. R. HARRIS  2,476,297
SHOCK TESTING DEVICE

Filed Jan. 14, 1946  2 Sheets-Sheet 1

INVENTOR.
EDWARD R. HARRIS
BY
William D. Hall
ATTORNEY

July 19, 1949.                    E. R. HARRIS                    2,476,297
                              SHOCK TESTING DEVICE
Filed Jan. 14, 1946                                        2 Sheets-Sheet 2

*INVENTOR.*
EDWARD R. HARRIS
BY
*William D. Hall.*
ATTORNEY

Patented July 19, 1949

2,476,297

UNITED STATES PATENT OFFICE 2,476,297

SHOCK TESTING DEVICE

Edward R. Harris, Los Angeles, Calif., assignor to the United States of America as represented by the Secretary of War Application January 14, 1946, Serial No. 641,154

8 Claims. (Cl. 315—364)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to improvements in shock testing devices.

In connection with the building of electronic equipment, particularly for military usage, a number of testing devices have been evolved to detect mechanical weaknesses, and to facilitate their elimination, so that the equipment and its components will withstand the various jolts and the rough handling which it is likely to receive in use. It is particularly important to test vacuum tubes in this respect. However, testing devices which have come to applicant's attention have not been entirely satisfactory.

Among other things, test impacts should be directed at the base of the vacuum tube rather than at its glass envelope. This procedure is believed to be correct because in actual use a tube sustains all or most of its shocks through the chassis of the equipment and the tube base rather than through the tube envelope. Also a blow upon the glass envelope is not a satisfactory test as glass envelopes are more prone to vary in thickness and strength than the more important components of a tube and hence the results of tests involving a blow on the glass envelope are not truly indicative of the ability of the tube to withstand shocks. Again, shock testing devices should preferably incorporate some quantitative means to determine and standardize the amount of shock being imparted. Also, as the type of shocks which have been found to be most destructive to vacuum tubes have a sharply peaked curve of vibration, this type of shock should be most closely simulated in testing devices. In devices which utilize heavy hammer means, the curve of vibration of the impact imparted has a rounded peak, due to the relatively great inertia of such hammer means.

It is therefore a principle object of the present invention to provide apparatus to determine the extent to which electron tubes can stand rough handling and use, before observable changes occur in the electrical and/or mechanical characteristics thereof.

It is another object to provide means of adequately measuring the impact force imparted to an electron tube so that the testing procedures may more readily be standardized.

It is another object to provide a bump test device whereby a blow may be delivered from the same angle and strike the same place each time it is desired.

It is another object to provide a bump tester which imparts bumps to the base rather than to the envelope of a tube.

It is a further object to provide an impact test device which can make tests with a tube in an upright or in an inverted position, and in which a tube may be rotated about its axis so as to receive blows from different directions as may be deemed advisable.

It is still another object to provide an impact test device which is relatively simple and inexpensive to manufacture and which is compact in size and easy to operate.

It is yet another object to provide a bump tester which may be readily operated by a person with no previous skill.

It is still a further object to provide a bump tester which requires no easily upset critical adjustments, which is sturdy and portable, and which may be simply compensated for variations due to the elements and the age and condition of the parts.

It is also an object to provide an impact test device which is adapted to closely re-enact the types of shock encountered in actual use, including the vibratory components of gun fire or ballistic explosions.

It is a further object to provide a bump tester whereby any selected hammer blow may be duplicated and the force of the impact thereof may be registered in comparative units which may be calibrated and easily expressed in foot-pounds or gravity units.

It is still another object to provide a mechanism for determining the ruggedness and ability of an electronic tube to withstand rough usage by reproducing and controllably exaggerating the components destructive to normal tube life, and measuring them in gravity or other suitable units.

It is a further object to provide an impact test device whereby the weak points of a tube may be localized so that informative data may be acquired relative to improvement of the tube.

These, and other objects and advantages of my present invention, which will be better understood as the detailed description thereof progresses, are obtained in the following manner:

I provide an impact test device which incorporates an elongated hammer of relatively light weight, which is pivotably mounted at its proximal end to a base, and is provided with an adjustable spring means by which the speed of its stroke may be varied.

Positioned so as to be struck by the distal end of the hammer is an anvil which is so secured to the base that it will respond vibrationally to a hammer stroke. Said anvil sustains one of several interchangeable tube sockets, which are of different sizes and shapes so as to accommodate different types of vacuum tubes, and provision is made for effecting electrical connections with a tube without any undue strain on its terminal prongs. The anvil is preferably rotatable so that it may be struck on different sides and the tube sockets are rotatable relative to the anvil, so that, by rotating the anvil and socket, a tube may be struck from every possible angle.

The amount of swing of the hammer is controlled by a ratchet member which is adapted to hold the hammer at any one of a plurality of positions, angularly spaced from the anvil, and to release the hammer and allow it to freely swing toward the anvil under the urging of the spring means. Thus, by adjusting the spring tension on the hammer and adjusting the position from which the hammer is released for its stroke toward the anvil, a multiplicity of impacts of different forces and characteristics can be obtained.

There is also provided an impact measuring member by which the force of an impact can be determined so that, despite changes in the tension of the spring with time, temperature and other factors, a standard range of impacts can always be duplicated. Said impact measuring member includes a pendulum and a scale and pointer to indicate the maximum amount of swing imparted to the pendulum when struck by the hammer. To determine the force of an impact to which a tube is subjected, the said impact measuring member is positioned upon the base in a position to receive the hammer blow in place of the anvil. When the hammer is released, it strikes the bob of the pendulum and causes it to swing and the pointer indicates the maximum point of its swing. The scale may be calibrated in any suitable units.

In the accompanying specification there is described, and in the annexed drawings shown, what is at present considered a preferred embodiment of my present invention. It is however to be understood that said invention is not to be limited to said embodiment, inasmuch as changes therein may be made without the exercise of invention and within the true spirit of the claims hereto appended.

Figure 1:
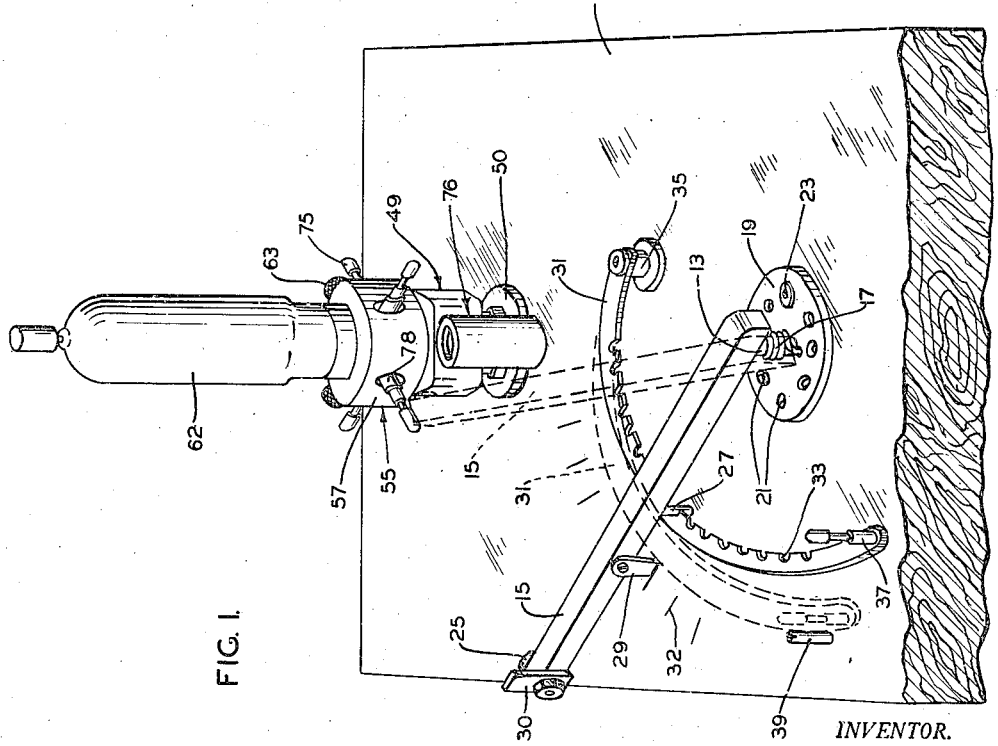
Figure 1 is a perspective view of a preferred form of shock testing device embodying the present invention, shown with a vacuum tube in position, the parts being shown, before release of the hammer, in solid lines and, after impact with the anvil, in broken lines.

Referring now more particularly to the drawings, there is shown a preferred embodiment of the present invention. It comprises a flat, horizontally disposed, baseboard 11, of plywood or other suitable material. Pivotally secured to said baseboard 11, by means of a vertically disposed hammer pivot pin 13, is an elongated hammer 15 (Figure 1). A coil spring 17, wound around the pivot pin 13, has its upper end secured to the hammer 15 and its lower end to a tension adjusting plate 19.

Said plate 19 is a circular disc of metal provided with a center hole to accommodate the said pivot pin 13 and a plurality of spring holes 21 about its peripheral portion. Said spring holes 21 are receivable to a screw 23 which extends down into the baseboard 11 to secure the plate 19 against rotation. The hammer 15, which is urged by the spring 17 into clockwise rotation about the pivot pin 13, has a contact head 25, preferably of hardened steel, secured to one side of its distal end and it is also provided with a depending ratchet pin 27, a depending pointer finger 29 and an upwardly extending hammer handle 30. Scale markings 32 are disposed in an arc upon the baseboard 11 so as to cooperate with the pointer finger 29.

Also pivotally secured to the baseboard 11, by means of a ratchet pivot pedestal 35, is an arcuately-shaped ratchet member 31 (Figure 1), which is provided, at its outer end, with an upwardly extending ratchet handle 37 and, along its inner edge, with a plurality of notches 33 receivable to the ratchet pin 27 aforementioned. The shape of the ratchet member 31 should be such that when it is swung away from the ratchet pin 27, so as to disengage it, the hammer 15 is free to swing to the anvil 49 described below, without the possibility of said pin 27 coming into contact with said ratchet member 31. This may be accomplished by making the radius of the ratchet member 31 equal to the distance between the hammer pivot pin 13 and the ratchet pin 27 and by positioning the ratchet pivot pedestal 35 at a slightly greater distance from said pivot pin 13. A ratchet stop 39 is also secured to the baseboard 11 so as to limit the outward swing of the ratchet member 31.

Figure 3:
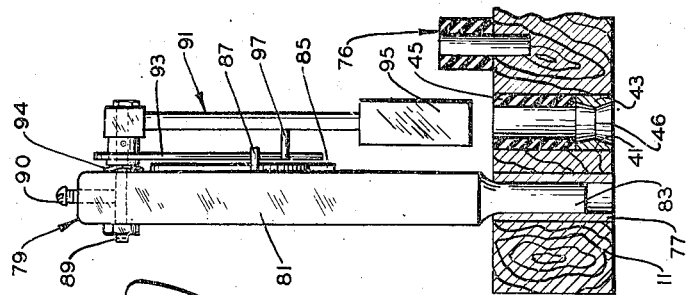
Figure 3 is an elevational view taken along the line 3—3 of Figure 2, the impact measuring device being shown in position upon the baseboard, which is shown in section, and the pointer being shown in its zero position.
Figure 2:
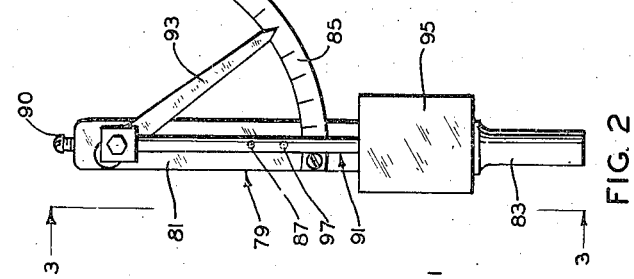
Figure 2 is an elevational view of the impact measuring member usable with said device, the pointer being shown in an indicating position.
Figure 7:
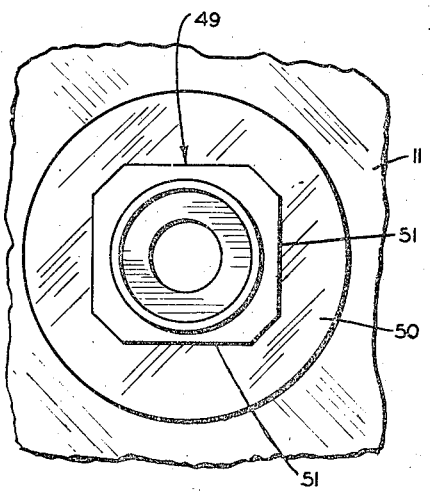
Figure 7 is a plan view of Figure 6.
Figure 6:
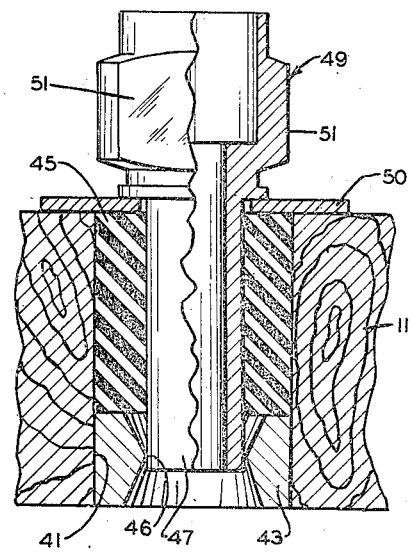
Figure 6 is an enlarged sectional view partly in elevation of the anvil in position in the baseboard.

The baseboard 11 is also provided with a circular aperture 41 (Figures 3 and 6) which is provided at its lower end with a sleeve 43, preferably of bronze, and above said sleeve with a resilient collar 45, preferably of soft rubber. The inner surface of said sleeve is preferably tapered at both ends so as to form a substantially single circular line 46 at its smallest diameter. Said sleeve 43 and collar 45 are coaxially disposed and are receivable to a cylindrical shank 47 of an anvil 49 (Figures 1, 6 and 7), the said line 46 making a fairly snug fit about the lower end of said shank but still allowing said shank to be rotatable and also allowing said anvil a certain amount of freedom to oscillate laterally at its upper end. The upper end of said shank 47 is encircled by a loosely fitting flat metal washer 50. Said anvil 49 is preferably made of hardened steel and is provided near its upper end with four flat vertically disposed anvil surfaces 51, and its upper end is hollowed out so as to be snugly receivable to a cylindrical shaft 53 of a tube socket 55.

Figure 5:
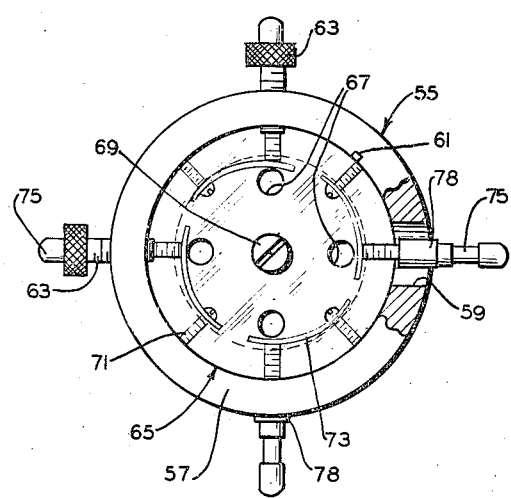
Figure 5 is a plan view, partly broken away and sectioned, of Figure 4.
Figure 4:
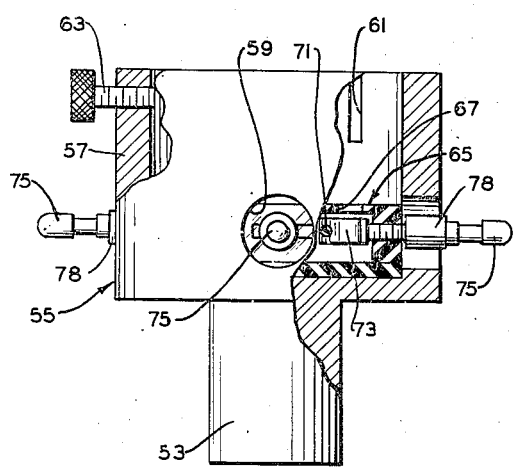
Figure 4 is an enlarged elevational view, partly sectioned, of the tube socket of Figure 1.

The tube socket 55 (Figures 1, 4 and 5) is made up of a hollow metal cup 57 secured coaxially to the upper end of said shaft 53. The cylindrical wall of said cup 57 is pierced by a plurality of openings 59 and its inner surface is cut by a vertically disposed slot 61. In the drawings four such openings 59 are shown as the tube socket 55 is adapted to take a vacuum tube 62 having but four terminal prongs, but other interchangeable tube sockets to take other tubes should also be provided. The upper portion of said cup 57 is also provided with two thumb screws 63 positioned approximately perpendicular to each other and extending through the wall of said cup.

A tube adaptor 65 (Figures 4 and 5) is positioned within the cup 57. Said adaptor 65 is a hollow shallow cylindrical member, of suitable insulating material, and its upper wall is pierced by a plurality of prong holes 67 (four being shown in the drawings), receivable to the terminal prongs (not shown) of an electronic tube 62 to be tested. Said adaptor 65 is secured to the base of the cup 57 by means of a bolt 69 which is loose enough to leave the adaptor free to rotate within said cup.

Sustained within the hollow adaptor 65, by means of bolts 71, are four contact elements 73, of flat springy metal, which contact elements respectively are maintained in arcuate positions by means of four terminal screws 75. Said terminal screws 75 are threaded horizontally through the walls of said adaptor 65 and extend through the openings 59. Each of said terminal screws 75 is encircled by a ring 78 of insulating material, to insulate it from the cup 57. Said terminal screws 75 are recessed circumferentially near their heads so as to be receivable to conventional alligator type electrical contact clips (not shown), or other suitable connective means.

Intermediate the circular aperture 41, mentioned above, and the hammer pivot pin 13, there is secured to the baseboard 11 a rubber covered fender 76 (Figures 1 and 3) adapted to stop the swing of the hammer 15 when its impact is being measured, as will become clear hereinafter.

A metal ferrule 77 (Figure 3) is secured through a hole in the baseboard 11 just beyond the circular aperture 41. Said ferrule 77 supports an impact measuring device 79 which is made up of a vertically disposed standard 81, terminating at its lower end in a cylindrical plug 83 which makes a snug fit in the said ferrule 77. A circular scale 85, marked off in foot-pounds or other suitable calibrations and extending through about 90°, and a short horizontal pin 87 are fastened to the front of the standard 81. A pendulum pivot shaft 89 extends through the upper end of the standard 81 and is prevented from rotating by a set screw 90. Pivotally suspended from said shaft 89 are a pendulum 91, which is free to swing thereabout, and a pointer 93, which is maintained in light frictional engagement with the standard 81 by means of a spring washer 94, so that it pivots thereabout only so far as it is actually pushed.

The pendulum 91 is provided with a bob 95, preferably of hardened steel, and a rearwardly extending finger 97. The pin 87 mentioned above and the finger 97 are so positioned that said pin acts as a stop for the pointer 93 when in its zero position and the finger engages the said pointer and pushes it upwardly along the scale 85 when the pendulum 91 is caused to swing in a counterclockwise direction.

In the operation of the impact testing device, just described, an electronic tube 62 may be tested as follows: the impact measuring member 79 is placed in operating position upon the baseboard 11 by inserting the plug 83 into the ferrule 77, the scale 85 being placed so as to extend away from the hammer 15. The bob 95 is then in a position to be struck by the hammer 15. The said hammer 15 is then pulled back manually, by means of the hammer handle 30, a desired angular distance in a counterclockwise direction, as determined by the pointer finger 29 along the scale markings 32, against the pressure of the spring 17, and the ratchet pin 27 is positioned in one of the notches 33 of the ratchet member 31.

The hammer 15 may then be released by pushing the ratchet member 31 outwardly, by means of the ratchet handle 37, whereupon the hammer 15 swings in a clockwise direction and strikes the bob 95 causing it to swing upwardly in a counterclockwise direction and carry the pointer 93 along with it. The bob 95 swings back but the pointer 93 is frictionally retained, by the spring washer 94, at the highest point of the pendulum swing, thus indicating, upon the scale 85, the force of the impact of the hammer 15. Said impact force may be increased or decreased by releasing the hammer 15 from different notches 33, or the tension of the spring 17 may be varied by removing the screw 23 and rotating the tension adjusting plate 19 to another position.

When a suitable force of impact has been obtained, the impact measuring member 79 is removed entirely from the baseboard 11 and the anvil 49 is secured thereto by inserting its cylindrical shank 47 down into the rubber collar 45 and the metal sleeve 43. A tube socket 55, of a size to accommodate a particular electronic tube 62 to be tested, is then operationally positioned by inserting its shaft 53 into the upper end of the anvil 49.

The tube 62 is then inserted into the tube socket 55, the terminal prongs thereof extending through the prong holes 67 and the tube being secured within said socket by means of the thumb screws 63. The terminal screws 75 are then screwed inwardly until the contact elements 73 make electrical connection with the terminal prongs of the tube 62. Electrical connection between the tube 62 and an outside circuit may then be effected by means of alligator type clips snapped on to the outer ends of the terminal screws 75. In view of the fact that in tubes having a bayonet pin on the side of its base, the pin is not always in exactly the same position relative to the terminal prongs thereof, the tube adaptor 65 is rotatable sufficiently to allow different tubes to be positioned in the tube socket 55. The terminal screws 75 are free to move with the adaptor 65 in view of the relatively large openings 59 through which they extend.

The hammer 15 is then caused to strike the anvil 49, thus transmitting the shock to the electronic tube 62. The tube 62 may be struck from any desired radial position by rotating the anvil 49 and/or the tube socket 55.

It will be seen that the lower end of the anvil 49 is held in single line contact within the sleeve 43 so that its upper end is able to pivot to some extent about its lower end. The rubber collar 45 provides the upper end of the anvil 49 with sufficient lateral freedom so that it can suitably oscillate and transmit such oscillations to the tube socket 55 and tube 62. The result is that, the pivot point being at the lower end of the anvil 49, said parts form a mechanical amplifier so that the tube 62 receives lateral deflections of greater amplitude than the anvil.

Although the hammer 15 is relatively light in weight, by suitably adjusting the angular distance of its swing and the tension on the spring 17, it is able to impart an impact of sufficient force, as it strikes at high speed. The relatively small mass of said hammer 15 however has little inertia and thus there results a sharp peaked curve of vibration, unlike the rounded peaked vibration curve which results when a heavier hammer is used.

The device described above simulates actual operating conditions in that impacts are transmitted to a tube through its base which is what ordinarily occurs in actual practice. Also the type of shock produced, as already described above, is similar to the type to which a tube is most generally subjected under operating conditions, and particularly the type sustained by a tube when subjected to ballistic explosions when in military use.

Electrical connections are provided so that the tube may be coupled to a suitable electrical circuit while it is being tested so that fluctuations in current will indicate variations in interelectrode spacing of the tube as a result of the mechanical impacts. It will be seen that the terminal screws 75 are purposely of small diameter and are not knurled so that excessive pressure on the terminal prongs and injury thereto are prevented.

While there has been described what is at present considered a preferred embodiment of the invention, it will be obvious to those skilled in the art that various changes and modifications may be made therein without departing from the invention, and it is therefore aimed in the appended claims, to cover all such changes and modifications as fall within the true spirit and scope of the invention.

What is claimed is:

1. In a shock testing device for an electron tube, an anvil, socket means sustained by said anvil and receivable to the base of said tube, a hammer, adjustable means to cause said hammer to strike said anvil, means adapted to measure the force of impact impartable by the hammer to the anvil.

2. In a shock testing device, a hammer, an anvil, adjustable means to actuate the hammer to cause it to strike the anvil, the anvil being pivotably sustained so as to be oscillatable when struck by the hammer.

3. In a shock testing device as defined in claim 2, the anvil being pivotably sustained by means of a sleeve providing substantially line contact about said anvil near one end thereof, and a collar of resilient material substantially surrounding said anvil.

4. In a shock testing device, a hammer pivotably sustained at one end, spring means adapted to urge said hammer to swing in one direction about its pivot, an arcuate ratchet member adapted to releasably hold said hammer against such swinging movement, scale means to indicate the angular position of said hammer when held by said ratchet means.

5. In a shock testing device as defined in claim 4, means adapted to measure the force of impact which may be imparted by the hammer when it it released.

6. In a shock testing device of the type having a hammer, means adapted to measure the impact which the hammer may impart, said means including a pendulum adapted to be struck by the hammer and means to indicate the maximum swing of the pendulum resulting therefrom.

7. In a shock testing device for an electron tube, a baseboard, a relatively light weight elongated hammer pivotably mounted thereon, spring means to impart a relatively high speed swing to said hammer, a vertically disposed elongated anvil secured to said baseboard so that its lower end is substantially held against lateral movement while its upper end is able to oscillate pivotably about said lower end, resilient means to limit the amount of such pivotable oscillation, rotatable socket means sustained by said anvil and receivable to an electron tube, means to releasably hold said hammer at any one of a plurality of positions at different angular distances from said anvil, said last named means including a ratchet member pivoted to said baseboard and a ratchet pin secured to said hammer and cooperable with said ratchet member, means to measure the impact impartable by said hammer to said tube, said last mentioned means including a pendulum positionable to be struck by said hammer and indicating means to show the maximum swing imparted to said pendulum when struck by said hammer.

8. In a shock testing device for an electron tube having downwardly extending terminal prongs, the combination including an anvil, socket means sustained by said anvil and receivable to the base and terminals of said tube, a hammer, adjustable means to cause said hammer to strike said anvil, and means adapted to measure the force of impact impartable by the hammer to the anvil, said socket means including a cylindrical cup provided with a vertical slot on its inner surface and a plurality of openings through the wall thereof, a shallow cylindrical tube adaptor rotationally positioned in the base of said cup, said adaptor including a top wall and a tubular lateral wall of insulating material and having a central cavity within said lateral wall and being provided with a plurality of holes through its top wall correlative to the openings aforementioned and respectively receivable to the terminal prongs of said electron tube, a similar plurality of correlative contact elements of springy electrical conducting material secured to the interior of said adaptor and disposed within the cavity aforesaid, a similar plurality of correlative terminal screws threaded through the lateral wall of said adaptor and adapted respectively to urge said contact elements inwardly into contact with said terminal prongs, said terminal screws respectively extending outwardly through the openings aforesaid in the cup, and electrical connection means on the outwardly extending portion of each of said terminal screws.

EDWARD R. HARRIS.

REFERENCES CITED

The following references are of record in the file of this patent:

UNITED STATES PATENTS

| Number | Name | Date |
| --- | --- | --- |
| 2,004,610 | Jones | June 11, 1935 |
| 2,388,246 | Berger | Nov. 6, 1945 |